United States Patent
Chaure et al.

(10) Patent No.: US 7,535,403 B2
(45) Date of Patent: May 19, 2009

(54) METHOD OF DETERMINING THE VELOCITY FIELD OF AN AIR MASS BY HIGH RESOLUTION DOPPLER ANALYSIS

(75) Inventors: Christian Chaure, Locmaria Plouzane (FR); Frédéric Barbaresco, Montgeron (FR)

(73) Assignee: Thales, Neuilly sur Seine (FR)

( * ) Notice: Subject to any disclaimer, the term of this patent is extended or adjusted under 35 U.S.C. 154(b) by 226 days.

(21) Appl. No.: 11/515,952

(22) Filed: Sep. 6, 2006

(65) Prior Publication Data

US 2007/0063887 A1  Mar. 22, 2007

(30) Foreign Application Priority Data

Sep. 6, 2005  (FR) .................................. 05 09095

(51) Int. Cl.
  *G01S 13/95* (2006.01)
  *G01S 7/02* (2006.01)
(52) U.S. Cl. .................. 342/26 B; 342/26 R; 342/101; 342/192; 342/195
(58) Field of Classification Search ................ 342/26 B
  See application file for complete search history.

(56) References Cited

U.S. PATENT DOCUMENTS

| 3,735,333 | A | * | 5/1973 | Balser et al. ................. | 367/105 |
| 5,729,465 | A | * | 3/1998 | Barbaresco ................... | 702/76 |
| 6,400,310 | B1 | * | 6/2002 | Byrnes et al. ................ | 342/115 |
| 2003/0055630 | A1 | * | 3/2003 | Byrnes et al. ................ | 704/205 |
| 2003/0074191 | A1 | * | 4/2003 | Byrnes et al. ................ | 704/203 |

FOREIGN PATENT DOCUMENTS

| EP | 0 749 083 A | 12/1996 |
| FR | 2 644 915 A | 9/1990 |

OTHER PUBLICATIONS

Barbaresco, Frederic. "Recursive Eigendecomposition Via Autoregressive Analysis & Ago-Antagonistic Regularization". 1997 IEEE International Conference on Acoustics, Speech, and Signal Processing. Apr. 21-24, 1997 vol. 5. pp. 3969-3972.*

(Continued)

*Primary Examiner*—Thomas H Tarcza
*Assistant Examiner*—Matthew M Barker
(74) *Attorney, Agent, or Firm*—Lowe Hauptman Ham & Berner, LLP

(57) ABSTRACT

A high resolution Doppler analysis of a radiofrequency signal is exemplified by the analysis of air mass movement using meteorological radar. A high resolution spectral analysis method for a remotely sampled periodic radiofrequency signal, based on the application of a trellis autoregressive filtering Burg algorithm, is used to determine the natural frequencies of the received signal for each distance cell based on the determination of an optimum set of reflection coefficients of the signal. Reflection coefficients are the object of a regularization operation aiming to limit the numerical instabilities of the calculations. These regularized reflection coefficients are used to estimate the effective order of the identification model of the trellis filter, and to determine the natural frequencies of the signal by determining the arguments of the complex roots of the polynomial representing the transfer function of the trellis filter.

12 Claims, 2 Drawing Sheets

OTHER PUBLICATIONS

Barbaresco F et al: "Calcul Des Variations et Analyse Soectrake: Equation Pour De Fourier et de Burgers Pour Modeles Autoregressifs Regularises Clculus of Variations and Spectrum Analysis: Fourier and Burgers Equations For Regularized Calculus of Variations and Spectrum Analysis: Fourier And Burgers Equations for Regularized Autogressive Models" vol. 17, No. 5/6, 2000 pp. 355-402, XP008065125.

Barbaresco F et al: Super Resolution Spectrum Analysis Regularization: Burg, Capon & AGO-Antoganoistic Algorithms Signal Processing: Theories and Applications, Proceedings of Eusipco, XX, XX, vol. 3, Sep. 10, 1996 pp. 2005-2008 XP008065123.

Barbaresco F et al: "Calcul Des Variations et Analyse Soectrake: Equation Pour De Fourier et de Burgers Pour Modeles Autoregressifs Regularises Clculus of Variations and Spectrum Analysis: Fourier And Burgers Equationa For Regularized Calculus of Variations and Spectrum Analysis: Fourier And Burgers Equations for Regularized Autogressive Models" vol. 17, No. 5/6, 2000 pp. 355-402, XP008065125.

Barbaresco F et al: Super Resolution Spectrum Analysis Regularization: Burg, Capon & Ago-Antoganoistic Algorithms Signal Processing: Theories and Applications, Proceedings of Eusipco, XX, XX, vol. 3, Sep. 10, 1996 pp. 2005-2008 XP008065123.

* cited by examiner

METHOD OF DETERMINING THE VELOCITY FIELD OF AN AIR MASS BY HIGH RESOLUTION DOPPLER ANALYSIS

RELATED APPLICATION

The present application is based on, and claims priority from, France Application Serial Number 05 09095, filed Sep. 6, 2005, the disclosure of which is hereby incorporated by reference herein in its entirety.

FIELD OF THE INVENTION

The invention relates to the general field of the high resolution doppler analysis of a radiofrequency signal. It deals more particularly with the analysis of the movement of air masses by means of a meteorological radar.

CONTEXT OF THE INVENTION

Prior Art

Precise knowledge of the movement of air masses in an area forming the area located in front of the flight path of an aircraft is of great importance. Indeed, it makes it possible to determine the presence of areas of turbulence that can be seriously prejudicial to the behaviour of the aircraft. This knowledge can be acquired by various means, and in particular through the intermediary of the meteorological radar installed in the aircraft, or more generally the airborne radar which can be a multifunction radar.

In the current state of the art, the meteorological radar detects movements of humid air masses which reflect the emitted radiofrequency signal and determines their velocities by doppler analysis, generally by Fourier transform. This relatively simple doppler analysis principle entails, in order to provide sufficiently accurate results, sending a waveform that makes it possible to collect, for a given distance, a large number of samples. Now waveforms with a large number of recurrences are not generally implemented by the meteorological radars for which the detection function is based on a relatively small number of samples (i.e. hits), in the order of 8 to 16 for example. The resulting spectral analysis by Fourier transform then does not offer sufficient accuracy to make an accurate determination of areas of turbulence. The same applies, all the more so, when the meteorological analysis function is performed by a multifunction radar for which the time allotted to the meteorological function is necessarily restricted.

This resolution problem also arises when it comes to ground installations where the activity consists in particular in detecting the movements of air masses in the landing zone and in approach zones. Such radiofrequency equipment often performs a high resolution doppler analysis which normally consists in using in particular an autoregressive analysis or even a natural subspace analysis. The received signal autoregressive analysis methods are more widely used. When only a small number of samples is available, these methods give a far better resolution than that obtained by Fourier transform, and are moreover relatively simple to implement. Their operating principle consists in estimating the mask (i.e. the coefficients) of a sliding filter suited to the signal and presupposes determination of the order of the filter for which definition is sought. The main consequence of an incorrect determination of the order of the filter and of its coefficients is that spurious targets are made to appear.

The standard high resolution autoregressive spectral analysis methods are normally recursive methods that have the drawback of generating numerical instabilities compromising the ability to detect the targets, particularly when the number of samples is small.

The problem of stability of the results obtained can be resolved by using methods known from the prior art, such as that developed by the applicant, which consists in particular in combining a trellis autoregressive filtering in blocks implementing the Burg algorithm or even a "MUSIC" (Multiple Signal Classification) type algorithm with a so-called regularization method. In addition to the filtering function, the trellis Burg algorithm determines the reflection coefficients $\mu_n$ which define the identification model applied to the signal. The determination of these coefficients has applied to it a regularization operation, one object of which is to ensure that they decrease as a function of the index n. The advantageous effect of the regularization operation is to make it possible to determine the effective order of the model. However, in the current state of the art, the regularization operation is normally applied empirically, which often leads to an imperfect determination of the order of the model, an imperfection that ultimately compromises the resolution of the measurements made.

SUMMARY OF THE INVENTION

One object of the invention is to propose a solution for improving the accuracy of the analysis made by means of the autoregressive methods known from the prior art, and in particular the methods that use the Burg algorithm, by accurately and systematically determining the order of the autoregressive model identified on the analysed signal, this object ultimately consisting in obtaining a better stability of the doppler analysis results obtained so as to be able to determine with sufficient accuracy the field of the radial velocities of the air masses of the analysis area concerned.

To this end, the subject of the invention is a high resolution spectral analysis method, the object of which is to establish the estimation of the spectral components of the received signal based on an identification model determined by means of an autoregressive filter of the BURG trellis filter type. This method applies the following main steps:

a step for filtering the received signal, a step that combines the application of a trellis filtering algorithm and a regularization operation, this operation being used to obtain a defined number of sets of reflection coefficients $\mu_n$, a step for selecting the optimal set of coefficients $\mu_n$, a step for determining the order M of the identification model of the signal, a step for determining the natural frequencies of the received signal based on the smoothed reflection coefficients $\mu'_n$ and the order M of the model.

In a preferred embodiment, the method according to the invention also comprises an additional step for producing a set of coefficients $\mu'_n$ by smoothing the coefficients tin of the optimal set, this additional step taking place between the step for selecting the optimal set of coefficients $\mu_n$ and the step for determining the order of the model.

In a particular embodiment, advantageously suited to analysing the movement of air masses, the method according to the invention also comprises an additional step for selecting, for each distance cell, which of the determined natural frequencies is the one that corresponds to the velocity of the air mass in the distance cell concerned.

In a preferred embodiment, this selection step is carried out by determining, for each distance cell, the power of the natural frequencies of the received signal on the Capon spectrum of the model.

The method according to the invention has the advantage of forming a method that can be used to accurately and systematically estimate the order of the identification model created by the trellis filtering algorithm used despite the small number of samples available for a given distance cell. Accurately knowing the order of the model makes it possible to more easily determine its natural frequencies.

This method also has the advantage of making it possible, in the case of an application to meteorological radars, to define the places where an abrupt change of the velocity of the air masses being analysed occurs. In this same application case, it can also be used, for the analysis of each distance cell, to take account, for determining the natural frequencies of the received signal, of the environment formed by the neighbouring distance cells. It can also advantageously be used to select, for each distance cell, the natural frequency most probably corresponding to the velocity of the air mass.

DESCRIPTION OF THE DRAWINGS

The characteristics and advantages of the method according to the invention will become clearly apparent from the description that follows, a description that is based on the appended drawings which represent.

DETAILED DESCRIPTION

Figure 1:
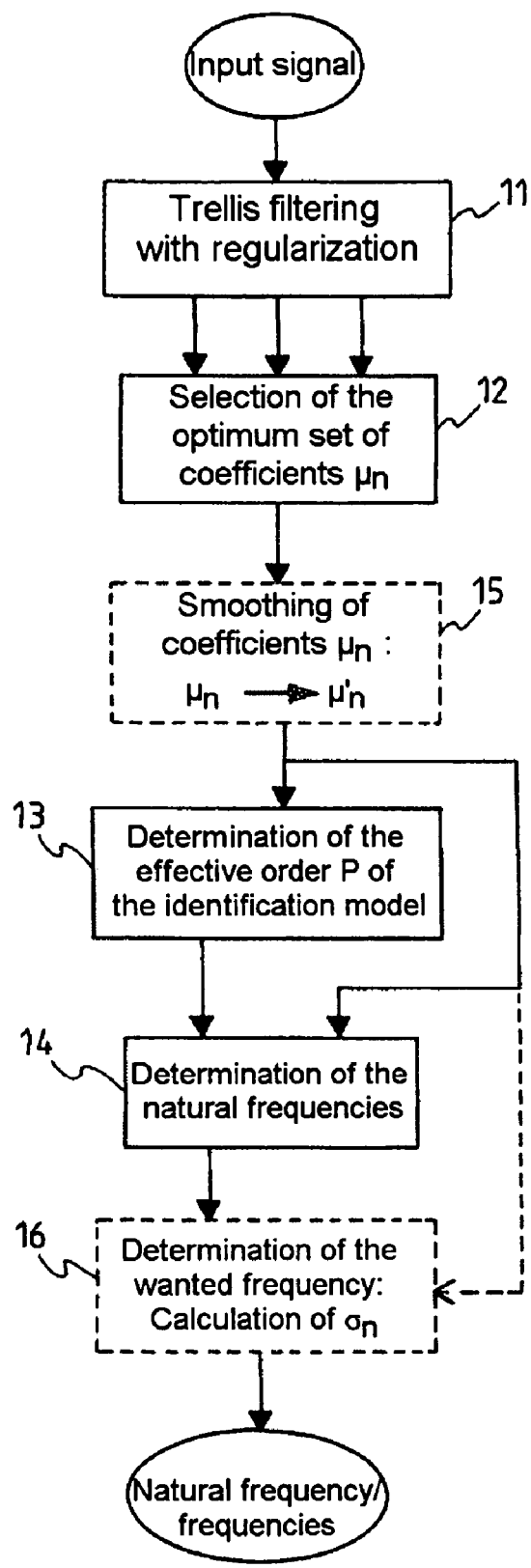
FIG. 1, a theoretical flow diagram of the sequence of the steps of the method according to the invention, FIG. 2, an outline illustration of the operating principle of a trellis filter applying the Burg algorithm, FIG. 3, an illustration highlighting the role of the step for smoothing the reflection coefficients.

As a general rule, the application of an autoregressive filter to a signal consists in determining an identification model which is as close as possible, for the application concerned, to the wanted signal, bearing in mind that the received signal corresponds to the wanted signal on which is superimposed a noise. The noise sources generally have various origins, internal to the system handling the reception and processing of the signal (thermal noise, etc.), or even external (clutter, etc.).

In the general case of a pulsed radar, the signal received by the receiver, after complex demodulation, produces a sampled signal on the sine (in quadrature) and cosine (in phase) channels constituting a series of complex samples, each sample corresponding to a small fraction of the radar range, also called distance cell. Analysis of the received signal in each distance cell, and in particular doppler analysis, entails integrating the signals generated by a number of pulses emitted consecutively. The environment, in particular the moving objects, and the operating conditions of the radar, are moreover assumed to be substantially unchanging throughout the analysis time. The analysis window of the signal relative to a distance cell is, for example, made up of N=8 to 16 samples accumulated during a sequence of N emissions or recurrences. Ideally, to perform the analysis, an effort is made to identify the received signal y(t) with a signal y'(t) consisting of a number P, preferably small, of complex sinusoids, that is, to model the signal by the following relation:

$$y(t) = y'(t) + B(t) = \sum_{j=1}^{P} A_j \cdot e^{i2\pi f_j t} + B(t) \quad [1]$$

where $A_j$ is a complex coefficient, B(t) a noise (thermal, clutter, etc.) with complex value and $f_j$ the natural frequencies (doppler frequencies) of the signal.

Concerning a radar operating in pulsed mode, the received signal is sampled at the rate of the repetition period, or PRI, of duration T. Consequently, for each distance cell, the signal y(t) appears as a numerical series having for expression:

$$y_n = y'_n + B(n \cdot T) = \sum_{j=1}^{P} A_j \cdot e^{i2\pi g_j nT} + B(n \cdot T) \quad [2]$$

Carrying out an autoregressive identification consists in best determining a set of p coefficients $a_1, \ldots, a_p$ such that the deviation $$"y_n - \sum_{j=1}^{p} a_j \cdot y_{n-j}"$$

is as small as possible in terms of a certain criterion that can be that of the minimum energy (least squares) such that it is possible to write:

$$y_n = \sum_{j=1}^{p} a_j \cdot y_{n-j} + e_n$$

where $e_n$ is the remainder of the estimation.

This formulation corresponds to the identification model of the signal $y_n$.

The spectral analysis then consists in determining the frequencies $f_j$, which entails determining the value of P. The frequencies are directly estimated from the phases of the roots of the complex polynomial $$P(z^{-1}) = 1 + \sum_{j=1}^{p} a_j \cdot z^{-j}.$$

The object of the method described in the application is to establish an expression of $y'_n$ which allows for a spectral analysis with the best possible resolution, this analysis being performed over a limited number N of samples, N typically ranging from 8 to 16.

Reference is made first to FIG. 1 which represents an illustration of the method according to the invention.

As can be seen in the figure, the method according to the invention comprises five main steps. It is applied for each distance cell to the received signal, and determines, for the same distance cell and according to the surrounding distance cells, the spectral component corresponding to the received signal.

The first step 11 consists in applying to the received signal samples a trellis AR (i.e. autoregressive) filtering algorithm in blocks applying the Burg algorithm. This type of filtering algorithm known from elsewhere is not expanded here. However, some general data relating to this algorithm is reviewed here.

The trellis filtering performs a predictive filtering of the received signal by identifying this signal with a model.

Figure 2:
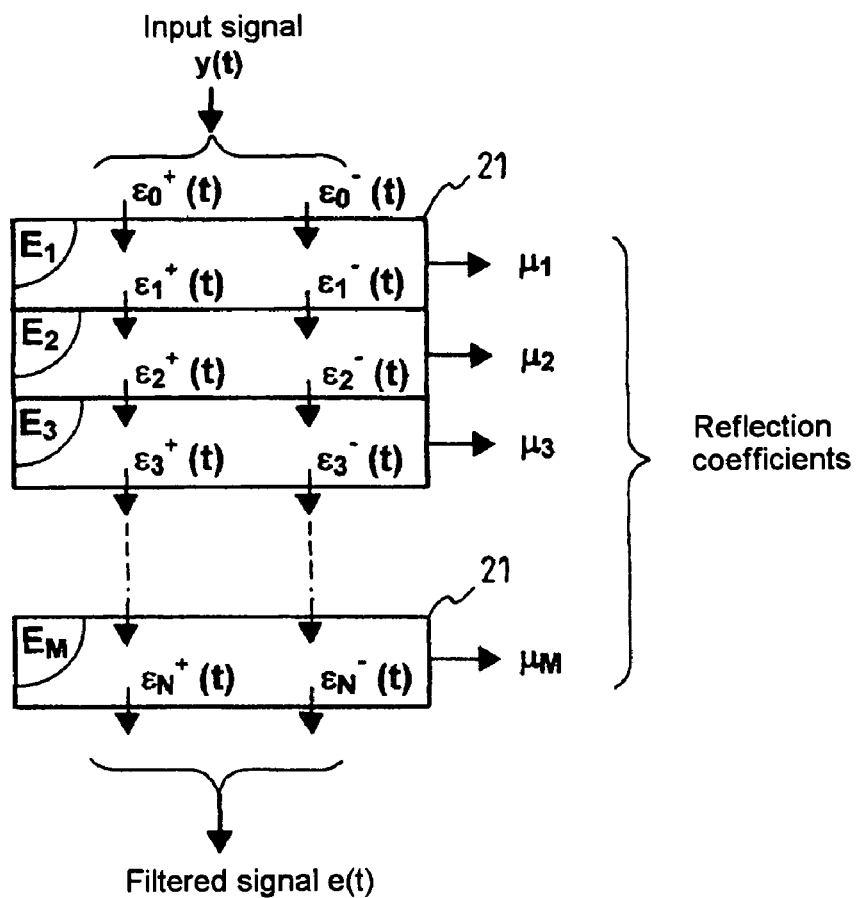

The operating principle of the Burg algorithm, illustrated in FIG. 2, relies on a stacking of M roughly identical calculation stages 21, which can be used to determine, for each stage n, the expression of the best linear estimation in least squares terms of the signal y(t)=$y_0$ received at an instant t as a function of the signals y(t−T)=$y_1$, y(t−2T)=$y_2$, ..., y(t−nT)=$y_n$ received at the same instant t corresponding to a given distance cell during the n preceding recurrences. Here, n is an integer number less than the number of stages M.

In order to simplify the notations, the notation y(t), where t represents a positive integer number varying from 1 to N, giving the number of recurrences available for the analysis, will be used hereinafter in the description to denote the received signal sample for a given recurrence.

Each stage $E_n$, 21, calculates, for each value of t and for a given distance cell, the front ($\epsilon_n^+(t)$) and back ($\epsilon_n^-(t)$) innovation functions.

$\epsilon_n^+(t)$ characterizes the deviation existing between y(t) and its best prediction in the least squares terms established from the preceding n samples.

$\epsilon_n^-(t)$ characterizes the deviation existing between y(t−nT) and its best prediction in least squares terms established from the n subsequent samples. It is restated here that the expression of the front and back innovations can be given for a stage n and for a given distance cell, by the following general relations:

$$\epsilon_n^+(t) = y(t) - P(y(t)|y(t-1), y(t-2), y(t-3), \ldots y(t-n)) \quad [3]$$

and $$\epsilon_n^-(t) = y(t-n) - P(y(t-n)|y(t), y(t-1), y(t-2), \ldots y(t-n+1)) \quad [4]$$

where "P(A|B)" represents the best linear estimate of A from B.

It is also here considered that the functions $\epsilon_n^+(t)$ and $\epsilon_n^-(t)$ here have a stationary character and therefore follow the same statistics for any integer t varying from 1 to N.

Based on the front and back innovations calculated for the set of the N samples, each of the stages $E_n$ determines the reflection coefficient $\mu_n$ associated for this stage with the identification model. These reflection coefficients $\mu_{n,i}$ that characterize the identification model are defined in a known way, according to the front and back innovations, by the following general relations:

$$\mu_n = -\sum_{t=n+1}^{N} (\varepsilon_{n-1}^+(t) \cdot \varepsilon_{n-1}^{-*}(t-1)) \Big/ \frac{1}{2} \cdot \left( \sum_{t=n+1}^{N} (|\varepsilon_{n-1}^-(t-1)|^2 + |\varepsilon_{n-1}^+(t)|^2) \right) \quad [5]$$

where the operator * denotes the complex union and |z| the modulus of the complex number z.

It is possible in this way to describe the trellis filter produced by the BURG algorithm as a system with M stages:

Stage 0: signal input:
$\epsilon_0^+(t) = \epsilon_0^-(t) = y(t)$, for any t between 1 and N=initialization of the algorithm Stages 1 to M:
$\epsilon_n^+(t) = \epsilon_{n-1}^+(t) + \mu_n \epsilon_{n-1}^-(t-1)$, for any t varying between n+1 and N.

$\epsilon_n^-(t) = \epsilon_{n-1}^-(t-1) + \mu_n' \epsilon_{n-1}^+(t)$, for any t varying between n+1 and N The filtered output signal is expressed as:
$e_M(t) = \epsilon_M^+(t) = y(t) + \Sigma_{n-1 \; to \; M} \mu_n \epsilon_{n-1}^-(t-1)$, for t varying between M+1 and N.

The filtered signal $e_M(t)$ is ultimately presented as a function of the back innovations calculated in each of the M stages.

By construction, the $\epsilon_n^-(t)$ form an orthogonal base of the vector space {y(t), y(t−1), ... y(t−M)}. The reflection coefficients −$\mu_n$ are the coefficients of the projection of y(t) on this base, they are also complex correlation coefficients.

The z transform of the linear filter for changing from the signal y(t) to the signal $\epsilon_n^+(t)$ is denoted $A_n^+(z^{-1})$.

The z transform of the linear filter for changing from the signal y(t) to the signal $\epsilon_n^-(t)$ is denoted $A_n^-(z^{-1})$.

$A_n^+(z^{-1})$ and $A_n^-(z^{-1})$ verify, by transposition of the trellis formulae, the following relations:

for n=0:

$$A_0^+(z^{-1}) = A_0^-(z^{-1}) = 1 \quad [6]$$

for n=1 to M:

$$A_n^+(z^{-1}) = A_{n-1}^+(z^{-1}) + \mu_n \cdot z^{-1} \cdot A_{n-1}^-(z^{-1}) = \sum_{j=0}^{n} a_{n,j} \cdot z^{-j} \quad [7]$$

$$A_n^-(z^{-1}) = z^{-1} A_{n-1}^-(z^{-1}) + \mu_n * A_{n-1}^+(z^{-1}) \text{ (Szegö polynomial)} \quad [8]$$

$A_M^+(z^{-1})$ is a $z^{-1}$ polynomial which is the z transform of the filter which thus transforms the signal y(t) into $e_M(t)$. $Z(\epsilon_M^+(t)) = A_M^+(z^{-1}) \cdot Z(y(t))$; where Z(A) represents the Z transform of the signal A. It can also be expressed by the following relation:

$$A_M^+(z^{-1}) = 1 + \sum_{n=1}^{M} a_n \cdot z^{-n} \quad [9]$$

in which:
the coefficient $a_0$ is equal to 1,
the coefficient $a_M$ is equal to μM.

Furthermore, the polynomials $A_n^+(z^{-1})$ and $A_n^-(z^{-1})$ are reciprocal, so the coefficient $a_0$ of the polynomial $A_M^-(z^{-1})$ is equal to $\mu_M^*$ and the coefficient $a_M$ of the polynomial $A_M^-(z^{-1})$ is equal to 1.

The duly defined terms $A_n^+(z^{-1})$ form a family of whitening filters since they produce the deviation between y(t) and its best linear estimation based on (y(t−1), ... y(t−n)).

The Burg algorithm practically determines the reflection coefficients $\mu_n$ at each stage of the trellis filter, using the fact that these coefficients minimize the functions $L_n(\mu_n)$ defined by the following empirical relation:

$$L_n(\mu_n) = \frac{1}{N-n} \cdot \sum_{t=n+1}^{N} |\varepsilon_n^+(t)|^2 + |\varepsilon_n^-(t)|^2 \quad [10]$$

$L_n(\mu_n)$ is a function of $\mu_n$ which depends in particular on $\epsilon_n^+(t)$ and $\epsilon_{n-1}^-(t-1)$.

Determining the reflection coefficients $\mu_n$ then consists in determining, for the value of $\mu_n$, the value that cancels the derivative of the function $L_n(\mu_n)$ relative to $\mu_n$.

This condition leads to determining n from the following relation:

$$\mu_n = -2 \cdot \frac{\sum_{m=n+1}^{N} \varepsilon_{m-1}^{+}(t) \cdot \varepsilon_{m-1}^{-}(t-1)^*}{\sum_{m=n+1}^{N} |\varepsilon_{m-1}^{+}(t)|^2 + |\varepsilon_{m-1}^{-}(t-1)|^2} \quad [11]$$

In the conventional cases of use of a trellis filter, it is the filtering function that is sought and the user is more particularly interested in exploiting the innovations to obtain the filtered signal $e_t$.

The object of the analysis method according to the invention, however, is to determine the natural frequencies of the received signal through the identification model. To do this, it uses, as illustrated in FIG. 1, the values of the coefficients $\mu_n$ determined by each stage. Now because of the small number of N samples that are available—N is for example equal to 8 or 16—implementing a conventional trellis autoregressive filter as illustrated by FIG. 2 proves unsatisfactory. In practice, it is known that, if there are sufficient samples, the identification algorithm produces values of the coefficients $\mu_i$ essentially decreasing with the rank of the stage concerned. On the other hand, the calculations show that this decrease does not hold up well if there are only a small number of samples. The main consequence of this poor behaviour is that it is difficult to determine the order of the identification model of the filter and that the spectral analysis of the signal through the model becomes insufficiently accurate.

A known method for overcoming this problem of poor convergence consists in applying, on determining the coefficients $\mu_n$, a Thikonov type regularization method which consists in adding corrective terms to the numerator and to the denominator of the expression of the coefficients $\mu_n$ given by the relations [5] and [12]. These corrective terms are intended to stabilize the calculation of the coefficients $\mu_n$. Then, the corrected coefficients $\mu_n$ are generally expressed by the following relation:

$$\mu_n = - \cdot \frac{\frac{2}{N-n} \cdot \sum_{m=n+1}^{N} \varepsilon_{m-1}^{+}(t) \cdot \varepsilon_{m-1}^{-}(t-1)^* + 2\cdot\Gamma\cdot\sum_{k=1}^{n-1} b_n(k) \cdot [A_{n-1}^{+}(k) \cdot A_{n-1}^{+}(n-k)]}{\frac{1}{N-n} \cdot \sum_{m=n+1}^{N} |\varepsilon_{m-1}^{+}(t)|^2 + |\varepsilon_{m-1}^{-}(t-1)|^2 + 2\cdot\Gamma\cdot\sum_{k=0}^{n-1} b_n(k) \cdot |A_{n-1}^{+}(k)|^2} \quad [12]$$

in which:
$b_n(k) = (2\pi)^2 (k-n)^2$,
$A_{n-1}^{+}(k)$ is the kth coefficient of the polynomial $A_{n-1}^{+}(z^{-1})$ defined by the relation [7].

The coefficient $\Gamma$ present in the numerator and in the denominator is called a regularization coefficient. The value of $\Gamma$ must be determined so as to optimize this regularization.

From a theoretical point of view, the regularization action consists in constraining the poles of the function $1/A_p^{+}(z^{-1})$ to be located closer to zero in the complex plane, the consequence of which is to render the transfer function more stable. The poles have less effect on the spectrum (modulus of $1/A_p^{+}(z^{-1})$ z being defined on the unit circle) such that the maxima are less marked. This is reflected on the series of moduli of the reflection coefficients $\mu_n$ by the reappearance of a decrease as a function of the order n of the stage.

The major problem raised by regularization lies in estimating the value to be assigned to $\Gamma$. In practice, too strong a regularization stabilizes the coefficients $\mu_n$ but distances the result obtained by filtering from the exact theoretical identification, incidentally out-of-reach. When the regularization coefficient is too great, it is observed that the poles of the identified transfer function $A_M^{+}(z^{-1})$ are distributed in a regular star about the zero of the complex plane. This regularity reflects a loss of information, because the position of the poles is supposed to reflect the actual frequencies of the sinusoids contained in the signal. Conversely, too small a regularization allows the reflection coefficients $\mu_n$ to fluctuate too greatly, and does not therefore fulfill the required function.

Various proposals are given in the literature concerning optimizing the regularization coefficient. Of particular note are the Bayesian approach, appropriateness to the data, average risk, cross-validation. These proposals are nevertheless more theoretical than practical, and in the state of the art, the regularization coefficient is generally determined empirically from a certain number of tests and often needs to be readjusted, the optimal value of this coefficient depending in particular on the power of the input signal y(t).

In the state of the art, the problem of estimating the value to be assigned to $\Gamma$ is therefore poorly resolved.

Advantageously, the method according to the invention proposes a method of determining the optimum regularization coefficient. This method according to the invention is associated with the BURG trellis filtering algorithm to constitute the processing performed during the filtering step 11 and the following step 12 for determining the optimum set of reflection coefficients $\mu_n$. This method is based on experimentation to define a new approach to the problem raised.

A study of the relation [13] expressing the regularized reflection coefficients reveals that this expression leads to a dimensionless result only on condition that the coefficient $\Gamma$ is uniform at a power. In practice, one half of the expressions of the numerator and of the denominator is proportional to the power of the input signal $P0 = E|y(t)|^2$, while the other half is an abstract entity dependent only on the coefficient of a transfer function $A_m^{30}(z^{-1})$. This is why the method according to the invention consists initially in choosing a coefficient $\Gamma$ in the following form:

$$\Gamma = q \cdot \frac{\sum_{t=1}^{N} |y(t)|^2}{N} \quad [13]$$

where q is a positive dimensionless coefficient, less than 1 and adjustable based on the data (i.e. on the signal received in the distance cell concerned), and that depends only on the signal-to-noise ratio. Typically, q takes values of the order of $10^{-4}$.

Thus, with the formulae of the regularized Burg algorithm having become uniform, the reflection coefficients no longer depend on the units and the spectrum obtained is unchanging when the input signal is multiplied by a constant. The estimations of the frequencies are not affected.

It should be noted that the value assigned to the coefficient q strongly affects the spectrum of the model. Thus, a coefficient q of the order of 1 leads to a flat spectrum and a series $S_\mu$ of virtually identical zero reflection coefficients. Conversely, when q decreases, the reflection coefficients $\mu_n$ increase in modulus regardless of the value of the index n.

For q located below a certain threshold, the regularization loses all effect and the coefficients of high index n return to values close to 1 fluctuating randomly from one index to another, particularly for indices greater than the effective order P of the identification model sought.

Finally, for intermediate values of q, the expected behaviour of the series $S_\mu$ is restored and this series then reveals the effective order of the model.

With the expression of Γ determined according to the relation [13], the method of estimating Γ according to the invention consists secondly in calculating a set of coefficients $\mu_n$ for several values of q. These various sets of coefficients are calculated by applying the regularized trellis filtering algorithm as many times as there have been values of q retained.

The method of estimating Γ according to the invention then continues in step 12 of the method with the analysis of the sets (or series) of coefficients $\mu_n$ obtained in the step 11. This analysis is performed by calculating for each value of q the quantity V(q) defined by the following relation:

$$V(q) = \sum_{n=p}^{M-1} S(|\mu_{n+1}| - |\mu_n|) \quad [14]$$

where $S(|\mu_{n+1}|-|\mu_n|)$ has the value $|\mu_{n+1}|-|\mu_n|$ if the difference $|\mu_{n+1}|-|\mu_n|$ is positive, and 0 if it is negative.

The quantity V(q) is called the positive total residual variation of the tail of the series $S_\mu$ of the reflection coefficients calculated for the value of q concerned. The tail of the series is made up of the coefficients $\mu_n$ having a positive integer index n between a positive integer number p less than M−1 and the number M−1 of stages.

The tail start index p is chosen to be greater than the number of frequencies expected in the spectral analysis. Thus, in the case of the spectral analysis performed in a meteorological radar, the number of frequencies expected is of the order of 3 or 4, each frequency being able in particular to correspond to a particular movement of the air mass. In such a case, the tail start rank p will, for example, be taken to be equal to 5.

It should be noted that when q takes a high value (that is, close to 1), V(q) roughly converges towards the ideal value V(q)=0. In practice, as has been stated previously, when q is high, the coefficients $\mu_n$ decrease in modulus when n increases. Conversely, an excessively high value of q leads to a crushing of the spectrum of the model. Conversely V(q) starts to increase when q decreases such that the regularization is no longer assured. The shrewd choice of the value of q can therefore be determined by fixing for V(q) a threshold that must not be exceeded.

The method of estimating Γ then continues by comparing each value of V(q) with a fixed threshold and retaining the smallest value of q for which V(q) remains less than the fixed threshold $S_1$, preferably of low value.

The duly retained value of q makes it possible to determine the optimum value of G, and the corresponding set of coefficients $\mu_n$.

Then, the method for determining the appropriate value of Γ can be described summarily by the following sequence of operations:

determination of a set of reflection coefficients $\mu_n$ for each tested value of q,
calculation of the value of the positive variation V(q) for each set of coefficients,
comparison of each calculated value V(q) with a predetermined threshold $S_1$,
selection of the smallest value of q for which V(q) remains less than the threshold $S_1$.

As an example, it is possible to consider the case of a regularized Burg filter comprising 12 calculation stages and producing a set of 12 reflection coefficients $\mu_1$ to $\mu_{12}$. The optimum coefficient Γ can be estimated according to the invention by choosing for q the four values $10^{-2}$, $10^{-3}$, $10^{-4}$ and $10^{-5}$ and by calculating the sets of coefficients $\mu_1$ to $\mu_{12}$ corresponding to each of the chosen values. The positive variations $V(10^{-2})$, $V(10^{-3})$, $V(10^{-4})$ and $V(10^{-5})$ are then calculated, and each calculated positive variation is compared with a predetermined threshold $S_1$. In the case of a 12-stage filter, and when the calculation of V(q) is performed with an index p equal to 5, the threshold $S_1$ is typically of the order of 0.15.

Given the small number of signal samples available for each distance cell, the set of optimum coefficients determined as described previously nevertheless leaves a certain imprecision on the coefficients themselves that it may be desirable to correct. To this end, the method according to the invention can comprise a step for smoothing these coefficients advantageously making it possible to exploit the environment formed by the neighbouring distance cells. Inserting this intermediate step which is interposed between the steps 12 and 13 leads to an advantageous variant of the method according to the invention. This intermediate smoothing step, indicated by the broken lines in FIG. 1, is described later in this document.

As illustrated in FIG. 1, the method according to the invention also comprises, in its most general version, following steps 11 and 12, a step 13, which consists in determining the effective order of the identification model determined in steps 11 and 12. This effective order corresponds to the number P of reflection coefficients $\mu_n$ needed to fully define the transfer function $A(z^{-1})$ characterizing the identification model.

The case of the use of a conventional trellis filter culminates in a transfer function which is presented as a $z^{-1}$ polynomial, the order of which corresponds to the total number M of reflection coefficients determined by the filter. The difficulty then consists in determining, or rather estimating, the real order P of the identification model.

In practice, the known theoretical results show that, for a Burg filter applied to a large number of samples, the reflection coefficients $\mu_n$ have a modulus close to 1 for a rank n less than a value P which corresponds to the effective order of the model, then decreasing for n greater than P. On the other hand, for a small number of available signal samples, as is particularly the case for meteorological radars, this property is not generally borne out because of the numerical instability which then affects the calculations of the coefficients $\mu_n$. Then, the conventional methods of estimating the order of the model, known from the prior art, such as the AKAIKE information criterion, the MDL test, the test of χ2, which operate on the powers $\sigma^2_n$ of the successive remainders of the trellis filter, are inoperative when they apply to the results of the Burg algorithm, unregularized, applied to a small number of samples. Furthermore, when the regularization takes place, if it is performed in a non-optimal manner, these same methods remain generally inoperative. Furthermore, even when an optimal regularization is carried out, these methods remain unsatisfactory, the error on the estimated order being for example 1 on models for which the effective order is 4. In the state of the art, the problem is therefore poorly resolved.

To solve this problem, the step 13 of the method according to the invention advantageously implements an original method which involves observing the optimal reflection coefficients determined in the steps 11 and 12. Since these coefficients are derived from an optimally regularized filter, they are presented as a series of coefficients $\mu_n$, the modulus of which is close to 1 for the values of n less than the value P which represents the order of the model, and the modulus of which takes a small and decreasing value for values of n greater than P. The method used by the method according to the invention, estimates the order of the model from the coefficients $\mu_n$ obtained by the regularized Burg filter by means of the advantageous method described previously.

According to the invention, the coefficients $\mu_n$ are observed during the step 13 by using a test function $G(\mu_n)$ which ensures a contrast making it possible to systematically produce a good separation between the significant coefficients $\mu_n$ having a modulus close to 1 and the coefficients $\mu_n$ for which the modulus is low. The function G thus transforms the series of the moduli of the reflection coefficients ($|\mu_1|$, $|\mu_2|$, $|\mu_3|$, ..., $|\mu_M|$) into a series of coefficients ($\xi_1, \xi_2, \xi_3, \ldots, \xi_M$) having a high contrast. The coefficients $\xi_n$ are then compared in descending order with a predetermined threshold $S_2$. Subsequently, the operation for determining the order of the model then consists in comparing the coefficients $\xi_n$ with the threshold $S_2$ in descending order of the indices, beginning with $\xi_M$, until the first coefficient $\xi_K$ is found for which the value is greater than $S_2$. The index P for which this condition is obtained constitutes the estimate of the effective order of the model.

The test function G can be defined in different ways, so long as it ensures a satisfactory contrast, making it possible to determine the order P systematically, using a simple test relative to a threshold $S_2$. $G(\mu_n)$ can, for example, be defined by the following relation:

$$G(\mu_n) = \frac{1}{4} \cdot Ath^2 |\mu_n| \qquad [15]$$

where the operator Ath corresponds to the "hyperbolic tangent argument" function The threshold $S_2$ is determined according to the order M of the trellis filter applied. Thus, for M=12, the threshold $S_2$ can be chosen to be typically equal to 0.3.

After the step 13, the method according to the invention can then be used to determine the expression of the transfer function $A(z^{-1})$, of order P, which defines the identification model. This function is generally expressed as:

$$A(z^{-1}) = A_P^+(z^{-1}) = 1 + \sum_{n=1}^{P} a_n z^{-n} \qquad [16]$$

where P corresponds to the estimate of the effective order of the duly determined model.

Now, it should be noted that if it is assumed that $z=e^{i\Theta}$, the expression $$S = \frac{1}{|A(e^{-i\theta})|^2}$$

represents the spectrum of the signal y(t), such that the determination of the roots of the polynomial $A(z^{-1})$ makes it possible to determine the natural frequencies of the signal, which are deduced from the arguments of the roots of $A(z^{-1})$.

The method according to the invention therefore comprises a step 14 during which the roots of the polynomial $A(z^{-1})$ and the spectral components of the signal y(t) are determined.

The roots of $A(z^{-1})$ can be determined in different ways, bearing in mind that, for a polynomial of order greater than 3, there is no analytical method that can be used to determine the roots of this polynomial. Therefore, beyond this order, a numerical determination by successive approximations is normally used.

However, in the case of roots belonging to the complex plane, determination by successive approximations is made difficult because of the possible dispersion of the roots.

To overcome this difficulty, the method according to the invention advantageously involves replacing the polynomial $A(z^{-1})$ with a polynomial $A'(z^{-1})$, the roots of which have arguments very close to those of $A(z^{-1})$ but which are located on the unit circle. Calculations conducted elsewhere and not expanded here show that such a polynomial can be determined by constructing a polynomial $A'(z^{-1})$ expressed by the following relation:

$$A'(z^{-1}) = A'^+_p(z^{-1}) = A^+_{p-1}(z^{-1}) + \frac{\mu_p}{|\mu_p|} \cdot z^{-1} \cdot A^-_{p-1}(z^{-1}) \qquad [17]$$

As can be seen, the coefficient of $z^{-p}$ which appears when the polynomial of the relation [17] is developed advantageously presents a modulus equal to 1 which simplifies the determination of the roots.

The search for the roots of the polynomial $A'(z^{-1})$ is advantageously simpler than that for the roots of $A(z^{-1})$.

The duly obtained polynomial $A'(z^{-1})$ can also be processed by means of a Cayley transform type transformation tool so as to obtain a rational function with real values $Q(z^{-1})$ reflecting $A'(z^{-1})$, the roots of which, equal to those of $A'(z^{-1})$ and located on the straight-line segment between $-\pi$ and $+\pi$, are easy to determine, particularly by dichotomy.

Having recourse to the use of a polynomial $A'(z^{-1})$, the roots of which are located on the unit circle, and to the Cayley transformation, thus makes it possible advantageously to determine the natural frequencies of the signal being analysed based on the identification module established after the steps 11 to 13.

Thus, as illustrated in FIG. 1, the sequence of steps 11 to 14, the method according to the invention provides a way of performing an analysis of the received signal which involves identifying the signal with a model, and determining the spectral components of the natural frequencies of said model. This method can be used advantageously to perform a spectral analysis with a resolution greater than that hoped for with a conventional FFT type doppler filtering, based on a relatively small number N of signal samples.

The implementation of the method according to the invention is also characterized by the method employed to calculate the regularization coefficient Γ, and by the method employed to determine the effective order of the model. The method is further characterized by the substitution method used to facilitate the search for the arguments of the roots of the polynomial $A(z^{-1})$, arguments that represent the natural frequencies of the model.

The method according to the invention thus produces, for each distance cell P, natural frequencies corresponding to the P roots of the polynomial $A(z^{-1})$ and characterizing the spectrum of the received signal.

The spectral analysis method according to the invention, as described in the above, can of course be implemented as such to determine for each distance cell the natural frequency or frequencies of the received signal. An additional processing can then be applied to keep the most significant frequency. It is then possible to consider each frequency as being representative of a detected object and separately process each of the natural frequencies.

In the case of a meteorological radar, the high resolution doppler analysis aims to produce an image of the radial velocity field of the atmospheric masses revealing the areas of disturbance. The information drawn from the signal derived from a given distance cell is strongly noise-affected, mainly because of the spread spectrum linked to the observed meteorological phenomenon (turbulent air mass), the imprecision on the statistics associated with the small number of samples available for each cell, the presence of any ground echo and the natural noise of the radar. This degradation of the received signal is normally reflected in the determination for each distance cell of several natural frequencies, the number of natural frequencies determined in this way not necessarily being identical from one distance cell to another near to the first. However, there is little relevance in modelling the received signal by a collection of well separated natural frequencies. The real spectrum is a wide spectrum which can be seen to correspond to a collection of very close frequencies grouped in bundles with a main centre frequency which marks the summit. It is this main frequency that is so important to determine, because it is this one that actually represents the doppler frequency, namely the velocity, of the atmospheric mass concerned. To this end, the method according to the invention can be complemented, particularly in the case of meteorological radar, with an additional step 16 consisting in determining, from the natural frequencies, the main frequency effectively corresponding to the velocity of the atmospheric mass.

According to the invention, the search for this frequency is performed by calculating the strongest level over the Capon spectrum of the signal. It is worth remembering here that the Capon spectrum of the received signal for a given distance cell is expressed as:

$$S(\theta) = \frac{1}{\displaystyle\sum_{n=0}^{R} \frac{1}{\sigma_n^2} |A_n^+(e^{-i\theta})|^2} \quad [18]$$

with $P \leq R \leq M$ where $A_n^+(e^{-i\theta})$ represents the function $A_n^+(z^{-1})$ defined by the relation [7], with $z = e^{i\theta}$. It should be remembered that $\theta$ is expressed as: $\theta = 2p \cdot f_j \cdot T$, where $f_j$ represents the natural frequency of the signal which is proportional to the velocity of the air mass for the distance cell i concerned.

According to the invention, $S(\theta)$ is calculated for all the values of $\theta$ corresponding to the natural frequencies. These values are then compared so as to determine the frequency giving the highest value. Given the fact that, as has previously been stated, the spectrum of the received signal is a wide spectrum with a main centre frequency which forms a summit, this particular natural frequency is chosen to represent the value of the velocity field for the distance cell concerned.

It should be noted that the coefficients $\sigma_n$ are determined by the following recurrence relations:

• $S_{0-1}$

• $S_n^2 = s_{n-1}^2 \cdot (1 - |\mu_n|^2)$ [19]

Thus, after the step 16, the spectral analysis performed by means of the method according to the invention leaves only a single natural frequency for each distance cell, a natural frequency which in the case of a meteorological analysis-oriented application corresponds to the value of the velocity field for the distance cell concerned.

Figure 3:
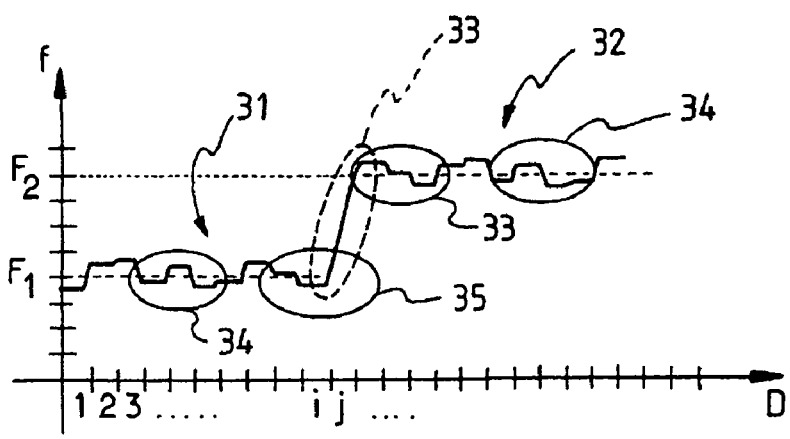

The method according to the invention as described in the above includes a certain number of advantageous characteristics that make it possible to perform a high resolution spectral analysis, effectively, powerfully and systematically, using a processing applying a trellis filtering algorithm and in particular the Burg algorithm. It is, however, possible to further increase the performance of the method according to the invention by performing an additional processing on the optimal set of coefficients $\mu_n$ after the step 12. This possibility is in particular offered when the signal y(t) received for a given distance cell is not totally independent of the signal received for the remote neighbouring cells. In such conditions, a variant of the method according to the invention can advantageously be implemented. This implementation variant interposes between the steps 12 and 13 of the initial method an intermediate operation 15, the object of which is to perform, for each distance cell, a smoothing of the optimum set of coefficients $\mu_n$, determined after the step 12, as a function of the sets of coefficients of the neighbouring cells The principle of this smoothing is illustrated by FIG. 3 which diagrammatically represents a possible change, with the passing distance cells, of the natural frequency of the received signal, corresponding for example to an atmospheric mass. In this example, the air mass concerned presents a velocity field—or frequency field—with two areas 31 and 32, in which the natural frequency variations are relatively small. In these areas, this frequency takes, depending on the distance cell concerned, a value that fluctuates about an average value, the frequency $F_1$ for the area 31, and the frequency $F_2$ for the area 32.

The velocity field corresponding to the example of FIG. 3 also includes a certain number of distance cells forming a transition area 33, and for which the associated natural frequency varies greatly.

In reality, this transition area can, for example, correspond to an area of turbulence, for which it is useful to determine the position and extent. The object of the smoothing operation proposed by the method according to the invention is to lessen the disparities between the reflection coefficients relating to the distance cells located in one and the same area 31 or 32 without in any way blurring the contours of each area, contours that mark the position of the areas of turbulence.

According to the invention, the smoothing operation is performed by applying, to each of the coefficients $\mu_n$ of the optimum set, a Gaussian, anisotropic and non-linear filtering operation which consists, for each distance cell r, in replacing each coefficient $\mu_n$ of the optimum set with a coefficient $\mu'_n$, the value of which results from a linear combination of the coefficients $\mu_n$ of the neighbouring distance cells. This linear combination is obtained over a range of distance cells centered on the cell r and of half width L (L, for example, can be set at 10) such that the window of the indices of the distance cells is between $\sup(0, r-L)$ and $\inf(L_{max}, r+L)$ where $L_{max}$ is the maximum number of distance cells available. This linear combination is presented as the sum of the coefficients $\mu_n$ weighted by weights, the form of which reflects Gauss's law and which is expressed, for the cell i concerned, as:

$$W_{r,i} = e^{-\frac{d(r,i)^2}{\sigma^2}} \quad [18]$$

where σ is an adjustable parameter of the variance type which controls the width of the Gaussian, and where d(r, i) represents a curvilinear distance separating the reference distance cell r, for which $\mu'_n$ is calculated, from the neighbouring distance cell i. The distance d(r, i) is curvilinear inasmuch as it is the sum of the distances between the adjacent distance cells present between r and i. d(r, i)=sum of r to i−1 of d(j,j+1) if i>r and sum of i to r−1 of d(j,j+1) if i<r
According to the invention, this elementary distance d(j,j+1) that will be denoted simply d is expressed by the following relation:

$$d^2 = \Delta x^2 + \Delta y^2 \quad [19]$$

Δx is a quantity proportional to the distance separating the two adjacent distance cells, therefore proportional to the width of the distance cell. Δx is defined by the following relation:

$$\Delta x^2 = \beta \cdot (d_j - d_{j+1})^2 \quad [20]$$

where β is an adjustable positive scale factor, $(d_i - d_r)$ representing the radial distance separating the two cells i and r.

Δy is a spectral distance defined, by means of the coefficients $\mu_n$ of the cells j and k=j+1 concerned, by the following relation:

$$\Delta y^2 = M \cdot \left[\log \frac{Pu_{j+1}}{Pu_j}\right]^2 + \sum_{n=1}^{M}(M-n)\left[\frac{1}{2} \cdot \arg th(|C_n|)\right]^2 \quad [21]$$

with: $C_n = \dfrac{\mu_{n,j} - \mu_{n,k}}{1 - [\mu^*_{n,k} \cdot \mu_{n,j}]} = \dfrac{\mu_{n,j} - \mu_{n,j+1}}{1 - [\mu^*_{n,j+1} - \mu_{n,j}]}$ [22]

The quantities $Pu_j$ and $Pu_k$ here represent the power of the signal received respectively for the cell j and the cell k, each distance cell j being conventionally represented by a vector with M+1 components $(Pu_j, \mu_{1j}, \mu_{2j}, \ldots, \mu_{Mj})$.

The powers $Pu_j$ and $Pu_k$ are also defined by the following relation:

$$Pu = \frac{\sum_{t=1}^{N}|y(t)|^2}{N} \quad [23]$$

where y(t) here represents the signal received in the distance cell concerned.

Δy represents a geodesic distance in the geometrical theory sense of the Chentsov information between spectra identified by the Burg algorithm assuming a Gaussian input signal (Riemannienne geometry of the information with, for metric tensor, the Fisher matrix on the complex variety of the parameters Pu and μ).

After the smoothing step 15, a new set of coefficients $\mu'_n$ is obtained, taken from the optimum set of coefficients $\mu_n$ which is used for the steps 13, 14, and 16 that follow.

It should be noted that the smoothing method according to the invention advantageously takes as a criterion the fact that the more a distance cell i is geographically or spectrally distant from the cell r concerned, the less the corresponding reflection coefficient $\mu_i$ is involved in the value of the smoothed coefficient $\mu_r$.

The non-linear character of the smoothing performed and its anisotropic character are linked to the use of a weighting law that depends for the indices r and i on the total curvilinear distance between r and i. Advantageously, the weighting law $W_{i,r}$ of the coefficients, used here, makes it possible to apply an effective smoothing of the coefficients μ. Thus, for the distance cells located in an area where the atmospheric mass has a velocity that is roughly constant, the total curvilinear distance that includes the spectral distance between two cells is relatively small and the smoothed value of the reflection coefficient $\mu_n$ of a given distance cell r belonging to that area will be the result of an averaging of coefficient values $\mu_i$ of the set of surrounding cells. Conversely, in the areas 35 close to the transition area 33, the smoothed value of the reflection coefficient of a cell r will be simply the result of the averaging of the values of the coefficients $\mu_i$ of the distance cells located on the same side of the transition area as the cell r concerned, the contribution of the cells that are geographically nearby but situated on the other side of the transition zone, i.e. spectrally distant, being very small.

The Invention claimed is:

1. A method to make a high resolution spectral analysis of a received range sampled periodic radiofrequency signal, said method determining the natural frequencies of the received signals, for each distance cell, from an autoregressive identification model, said method comprising the following steps:
   a filtering step applying to the received signal a trellis autoregressive filtering algorithm comprising M calculation stages, said step calculating, from N signal samples of said received signal, a set of M reflection coefficients $\mu_n$ characteristic of the received signal, the trellis filtering algorithm being combined with a calculated coefficient regularization operation so as to render the expression of the reflection coefficients dependent on a regularization coefficient Γ; the trellis filtering algorithm being applied for different selected values of Γ during the filtering step, so as to obtain several sets of coefficients $\mu_n$, each corresponding to one of the selected values of Γ;
   a step for determining an optimum set of reflection coefficients, from the sets of coefficients determined in the filtering step;
   a step for determining the effective order P of the identification model of the filter, from the optimum set of M coefficients $\mu_n$ by analysing the coefficients $\mu_n$ through a contrast function $G(\mu_n)$;
   a step for determining the natural frequencies of the identification model, these natural frequencies being the roots of a polynomial $A(z^{-1})$ characterizing the transfer function of the filter produced by the filtering algorithm, said natural frequencies being considered as the spectral components of the received signal.

2. The method according to claim 1, in which the filtering step applies a trellis Burg algorithm.

3. The method according to claim 2, in which the regularization coefficient Γ is expressed as:

$$\Gamma = q \cdot \frac{\sum_{t=1}^{N}|y(t)|^2}{N}$$

where y(t) represents the received signal for a given distance cell, N the number of samples and q a positive dimensionless coefficient, less than 1, that is adjustable and that depends only on the signal-to-noise ratio.

4. The method according to claim 1, in which the regularization coefficient Γ is expressed as:

$$\Gamma = q \cdot \frac{\sum_{t=1}^{N} |y(t)|^2}{N}$$

where y(t) represents the received signal for a given distance cell, N the number of samples and q a positive dimensionless coefficient, less than 1, that is adjustable and that depends only on the signal-to-noise ratio.

5. The method according to claim 1, in which the optimum set of reflection coefficients is determined by analysing, for each set, the value of the quantity V(q) defined by the following relation:

$$V(q) = \sum_{n=p}^{M-1} S(|\mu_{n+1}| - |\mu_n|)|$$

where $S(|\mu_{n+1}|-|\mu_n|)$ has the value $|\mu_{n+1}|-|\mu_n|$ if the difference $|\mu_{n+1}|-|\mu_n|$ is positive, and 0 if it is negative, $\mu_{n+1}$ and $\mu_n$ respectively corresponding to the reflection coefficients calculated by the stages n and n+1, the indices n of the coefficients being between a positive integer number p less than M−1 and the number M−1, M representing the total number of stages of the filter, p being chosen to be greater than the number of frequencies expected in the spectral analysis.

6. The method according to claim 1, in which the contrast function $G(\mu_n)$ is expressed as:

$$G(\mu_n) = \frac{1}{4} \cdot Ath^2 |\mu_n|$$

where the operator Ath corresponds to the "hyperbolic tangent argument" function.

7. The method according to claim 1, in which the step for determining the natural frequencies of the identification model is implemented by determining the roots of the polynomial $A'(z^{-1})$ expressed as:

$$A'(z^{-1}) = A_p'^+(z^{-1}) = A_{p-1}^+(z^{-1}) + \frac{\mu_p}{|\mu_p|} \cdot z^{-1} \cdot A_{p-1}^-(z^{-1})$$

where P corresponds to the estimate of the effective order of the model.

8. The method according to claim 1, also comprising an additional step in which is determined, for each distance cell, which of the previously determined natural frequencies is the one that constitutes the main frequency, corresponding to the value of the velocity field in the cell concerned.

9. The method according to claim 8, in which the main frequency is determined by searching for the natural frequency $f_j$ that gives the strongest value of the Capon spectrum, defined by:

$$S(\theta) = \frac{1}{\sum_{n=0}^{R} \frac{1}{\sigma_n^2} |A_n^+(e^{-i\theta})|^2}$$

where:
$\theta = 2\pi T f_j$ corresponds to the natural frequency of the signal
$\sigma_n^2$ correspond to the power of the successive remainders of the trellis filter.

10. The method according to claim 1, comprising:
an intermediate step for smoothing the reflection coefficients forming the optimum set, this smoothing consisting of performing a Gaussian, anisotropic and non-linear filtering operation, the function of which is to replace each coefficient $\mu_n$ of the optimum set with a coefficient $\mu'_n$, the value of which results from a linear combination of the coefficients $\mu_n$ of the neighbouring distance cells.

11. The method according to claim 10, in which the linear combination is presented as the sum of the coefficients $\mu_n$ of the neighbouring cells weighted by weights, the form of which reflects Gauss's law and which is expressed, for the cell i concerned, as:

$$W_{r,i} = e^{-\frac{d(r,i)^2}{\sigma^2}}$$

where σ is an adjustable parameter of the variance type which controls the width of the Gaussian, and where d(r, i) represents a curvilinear distance separating the reference distance cell r, for which $\mu'_n$ is calculated, from the neighbouring distance cell i concerned.

12. The method according to claim 11, in which the distance d(r,i) takes the form:

$$d^2 = \Delta x^2 + \Delta y^2$$

where Δx and Δy are defined by the following relations:

$$\Delta x^2 = \beta \cdot (d_j - d_{j+1})^2,$$

where β represents an adjustable positive scale factor and $(d_i-d_r)$ the radial distance separating cells i and r, and $$\Delta y^2 = M \cdot \left[\log \frac{Pu_{j+1}}{Pu_j}\right]^2 + \sum_{n=1}^{M} (M-n) \left[\frac{1}{2} \cdot argth(|C_n|)\right]^2$$

with: $C_n = \frac{\mu_{n,j} - \mu_{n,j+1}}{1 - [\mu_{n,j+1}^* \cdot \mu_{n,j}]}$ the indices j and j+1 representing two adjacent cells, and with:

$$Pu = \frac{\sum_{t=1}^{N} |y(t)|^2}{N},$$

where y(t) represents the received signal for a given distance cell.

* * * * *